United States Patent [19]

Yamamoto et al.

[11] Patent Number: 5,011,875

[45] Date of Patent: Apr. 30, 1991

[54] CORROSION RESISTANT, WATER EXPANDABLE COMPOSITION

[75] Inventors: Yuji Yamamoto; Hideyuki Shigematsu, both of Hiroshima; Hiroshi Tanaka, Aichi; Ryo Ashikawa, Aichi; Tatsuo Ishida, Aichi, all of Japan

[73] Assignees: Hiroshima Kasei Ltd.; Mitsubishi Jidosha Kogyo Kabushiki Kaisha, both of Tokyo, Japan

[21] Appl. No.: 501,389

[22] Filed: Mar. 26, 1990

Related U.S. Application Data

[63] Continuation of Ser. No. 176,192, Apr. 1, 1988, abandoned.

[51] Int. Cl.5 .............................. C08J 5/18; C08J 7/04; C08L 23/16; C08L 47/00
[52] U.S. Cl. ..................................... 524/45; 524/517; 524/916; 525/184; 525/186
[58] Field of Search .................... 524/45, 517, 916; 525/184, 186

[56] References Cited

U.S. PATENT DOCUMENTS

| | | | |
|---|---|---|---|
| 4,051,066 | 9/1977 | Miksic et al. | 252/389.5 |
| 4,211,851 | 7/1980 | Sasayama | 525/108 |
| 4,368,828 | 1/1983 | Samuel et al. | 524/494 |
| 4,389,513 | 6/1983 | Miyazaki | 525/186 |

Primary Examiner—Merrell C. Cashion, Jr.
Assistant Examiner—C. Azpuru
Attorney, Agent, or Firm—Browdy and Neimark

[57] ABSTRACT

A corrosion resistant, water expandable composition comprising:
(A) 100 parts by weight of at least one material selected from the group consisting of rubbers, thermoplastic resins and mixtures thereof;
(B) 10-200 parts by weight of a water-absorbable material; and
(C) 5-30 parts by weight of a corrosion inhibitor is disclosed.

7 Claims, 1 Drawing Sheet

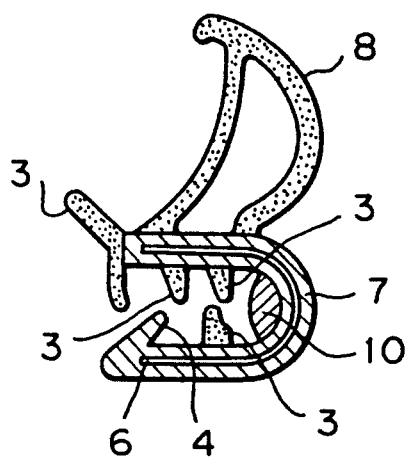
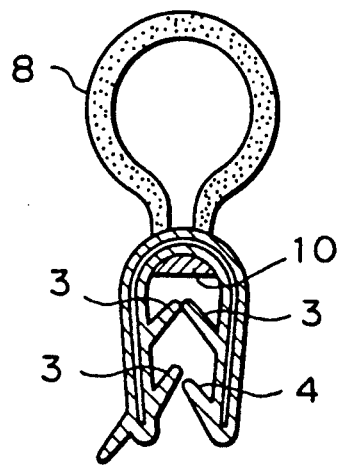
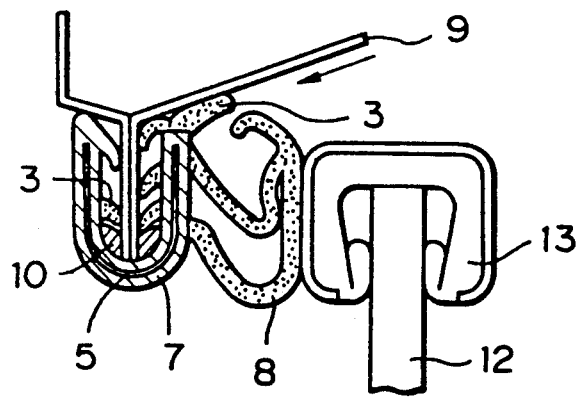
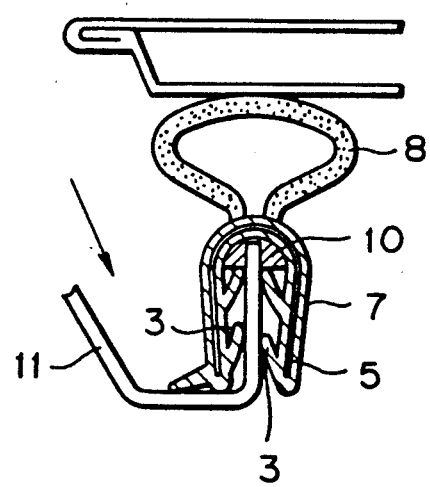
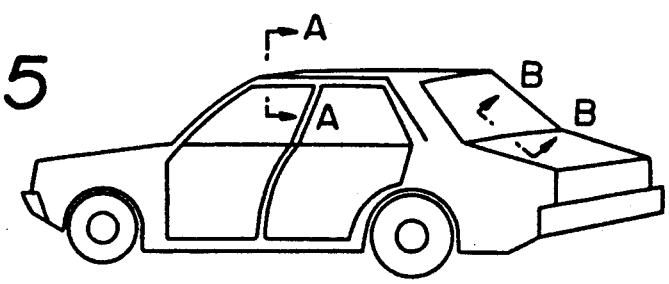

CORROSION RESISTANT, WATER EXPANDABLE COMPOSITION

This application is a continuation of application Ser. No. 07/176,192 filed Apr. 1, 1988 now abandoned.

BACKGROUND OF THE INVENTION

This invention relates to a corrosion resistant, water expandable composition.

Even when the present composition comes into contact with a metallic material in the presence of water, it does not corrode the metallic material. Therefore, the present composition can be used for gaskets, such as weather strips for automobiles, various types of sealants and caulking materials.

The term "water-expandable material" used in the specification and claims means a material which expands in the presence of water. That is, when the water-expandable material contacts water, a hydrophilic portion of the material forms a hydrogen bond with water molecules, or the material physically holds water, whereby the material itself expands.

SUMMARY OF THE INVENTION

An object of this invention is to provide a corrosion resistant, water expandable composition which can be used for gaskets, sealants, caulking materials, etc.

This invention relates to a corrosion resistant, water expandable composition comprising:

(A) 100 parts by weight of at least one material selected from the group consisting of rubbers, thermoplastic resins and mixtures thereof;

(B) 10–200 parts by weight and preferably 30–140 parts by weight of a water-absorbable material; and (C) 5–30 parts by weight and preferably 10–25 parts by weight of a corrosion inhibitor.

BRIEF EXPLANATION OF THE DRAWINGS

FIGS. 1 and 2 are sectional views of weather strips;

FIGS. 3 and 4 are sectional views of states in which the weather strips of FIGS. 1 and 2 are mounted to flanges of car; and FIG. 5 is a perspective view of car for explaining the position at which the weather strips with the present sealant are mounted to automobile.

DETAILED DESCRIPTION OF THE INVENTION

Examples of the rubbers which can be employed in the practice of this invention include natural rubbers, styrene-butadiene rubber, chloroprene rubber, ethylene-propylene rubber, silicone rubber, urethane rubber, butadiene-acrylonitrile copolymer, polyisoprene rubber, polybutadiene rubber and the like. Examples of the thermoplastic resins which can be employed in the practice of this invention include polyethylene, ethylene-vinyl acetate copolymer, polyvinyl butyral resin, polypropylene, polyvinyl chloride, polystyrene, acrylic resins, polyamides and the like.

Examples of the water-absorbable materials which can be employed in the practice of this invention include acrylic acid type polymers, polyvinyl alcohol-cyclic acid anhydride graft copolymer, isobutylene-maleic acid copolymer, starch-polyacrylic acid graft copolymer, vinyl acetate-acrylate copolymer, polyethylene oxide type polymers, carboxymethyl cellulose type polymers, starch-polyacrylonitrile graft copolymer and the like.

The corrosion inhibitors employed in this invention act to inhibit the positive or negative reaction in a corrosion reaction. When the corrosion inhibitor comes into contact with water, it is dissolved in the water, thereby preventing the corrosion action of the corrosion medium. The corrosion inhibitor lowers the surface energy of the metal.

Examples of the corrosion inhibitors which can be employed in the practice of this invention include phosphonates, amino trismethylene phosphonic acid, 1-hydroxy-ethylidene-1,1-diphosphonic acid, organic phosphates, amine phosphonates, phosphonium compounds, sarcosine, benzoates, oxycarboxylic acids, amines, lignine, lignine sulfonates, polyacrylamide, 2,3-dimethyl-1-nitro-2-butene, p-aminobenzaldehyde, cinnamates, methyl ammonium-2,4-dinitrobenzoate, fatty acid salts, sodium succinate, sodium benzoylacrylate, 2,3-dimethyl-1-nitro-2-butene, gluconates, n-lauroylsarcosine, n-coco-aminopropionic acid, 4-n-hexyl catechol, 4-n-butyl catechol, trimethyl ammonium-2,4-dinitrobenzoate, nitro benzoic acid hexamethylene imine, 3,5-dinitrobenzoic acid piperidine, benzoic acid amides, mixture of phosphonate and polymer electrolyte, calcium salts, zinc salts, magnesium salts, aluminum salts, polyphosphates, polysilicates, chromates, nitrites, molybdenum oxide salts, tungsten oxide salts, technetium peracid salts, lithium hydroxide and the like.

The present composition contains both a water-absorbable material and a corrosion inhibitor. When the present composition is used for mounting weather strips on automobiles, the water-absorbable material in the composition expands in the presence of water to ensure the gap is sealed and, at the same time the corrosion inhibitor in the composition prevents corrosion of the metallic parts of the automobile.

When more than 200 parts by weight of the water-absorbable material (B) are used per 100 parts by weight of rubber or resin (A), the physical strength of the composition is greatly reduced. When less than 30 parts by weight of (B) are used per 100 parts by weight of (A), sufficient water-expandability cannot be achieved.

When more than 30 parts by weight of the corrosion inhibitor (C) are used per 100 parts by weight of (A), the water-expandability is insufficient and each of the components in the composition cannot be blended uniformly. When less than 5 parts by weight of (C) are used per 100 parts by weight of (A), the corrosion inhibition is insufficient.

The present composition comprising the rubber and/or thermoplastic resin (A), the water-absorbable material (B) and the corrosion inhibitor (C) may contain a variety of additives for rubber or plastics, such as a plasticizer, stabilizer, an ultraviolet absorber, an antistatic agent, a self-extinguishing agent, a filler, a reinforcing material, a colorant, a foaming agent, a crosslinking agent, an aging resistant agent and the like.

Therefore, if the present composition contains a foaming agent, it can be foamed after it has been applied to the relevant parts. If the present composition contains a crosslinking agent, it can be crosslinked when it is applied to the relevant parts. It depends on the end-use condition of the composition whether or not the present composition is foamed or crosslinked.

Generally speaking, it is preferable that the present composition contains a foaming agent but not a crosslinking agent in order to enhance water-expandability.

Silica and clay are preferably used as fillers.

The present composition exhibits both the sealing effect by increase in its volume and corrosion-resistant effect.

It is preferable that water-solubility of the present composition is 0.05–50 g/l at 20° C. It is preferable that pH of the present composition is 5–11.

It is preferable that the components of the present composition have the following relationships: affinity between components (B) and (C) ≦ affinity between components (A) and (C) < affinity between water and component (C) < affinity between metal and component (C).

FIGS. 1 and 2 show the embodiments in which the present corrosion resistant, water expandable composition is applied to weather strips for automobile. Welt portion is shown at 7. Lips are shown at 3. Core metal is shown at 6. Hollow sealing portion is shown at 8. The present composition (sealant) is shown at 10.

FIG. 3 shows that the weather strip with the present sealant is mounted to body flange 9 of the car doors. The flange 9 is made of metal (iron). In this case, the sealant expands by the several times of its volume in the presence of water and presents from the iron's being corroded. In FIG. 3, door is shown at 12 and door sash is shown at 13.

FIG. 4 shows that the weather strip with the present sealant is mounted to trunk flange 11 of the car. Flange 11 is made of metal (iron).

This invention is further explained in the following non-limiting examples. All parts and percents are on a weight basis, unless specified otherwise.

The test methods used for evaluating corrosion inhibition and expansion in water were as follows:

Test method for evaluating corrosion inhibition

An iron plate 1 mm thick was cut into pieces 50 mm × 70 mm in size. The uneven portions of the side surface of the pieces were removed by abrasion. The pieces were degreased by ultrasonic waves in acetone. One surface of each of the pieces was masked. The other surface and the sides of each of the pieces were finished by baking with melamine-acrylic resin. The non-coated surface of each of the pieces was ground with emery paper (No. 200–No. 600) and finally a dispersion of alumina. Thereafter, the pieces were degreased by ultrasonic waves in acetone.

In the Examples, the present corrosion resistant, water expandable composition was sandwiched between the non-coated surfaces of the two pieces and weighed and immersed in 4 liters of tap water in a beaker. In the control test, the same procedures were repeated without use of the composition.

The beaker was placed in a constant temperature water bath of 25° C. Distilled water was replenished at intervals of 24 hours. After 9000 hours had passed, the sample was picked out of the water. The rust on the sample was removed with a tooth brush. The sample was washed with distilled water, dried by drier and weighed. The corrosion rate is expressed by reduction in weight per definite area and definite time. The unit for measuring the corrosion rate is mg·dm$^{-2}$·day$^{-1}$ (mdd).

Corrosion inhibition (Z) was calculated using the following equation:

$$Z = \frac{P_o - P}{P_o} \times 100(\%)$$

$P_O$: corrosion rate in blank test without using a corrosion inhibitor

P : corrosion rate in examples and comparative examples with use of a corrosion inhibitor.

When Z = 100% (P = O), complete corrosion inhibition is achieved.

When O < Z < 100% (P < $P_o$), partial corrosion inhibition is achieved.

When Z = O% (P = $P_o$), corrosion rate does not change.

When Z < O% (P > $P_o$), corrosion is accelerated.

Test method for expansion in water

The 50 mm × 70 mm sample was immersed in distilled water at room temperature for 96 hours. The increase in volume of the sample was measured.

EXAMPLES 1 AND 2 AND COMPARATIVE EXAMPLES 1 AND 2

Samples of the following types were prepared from the compositions given in Table 1:

Non-foaming type, crosslinking type, corrosion resistant, water expandable sealant (Example 1) and foaming type, crosslinking type, corrosion resistant, water expandable sealant (Example 2).

Samples of the following types were prepared from the compositions given in Table 2:

Non-foaming type, crosslinking type, water expandable sealant without any corrosion inhibitor (Comparative Example 1) and foaming type, crosslinking type, water expandable sealant without any corrosion inhibitor (Comparative Example 2).

All the components except sulfur (promoter) were blended in a kneader. Thereafter, sulfur was added to the mixture; and a calendered sheet 2.5 mm thick was obtained using calender roll.

Each of the sheets of Example 1 and Comparative Example 1 was compressed at 150° C. for 10 minutes by using a mold having a depth of 2 mm to vulcanize the resin. Each of the sheets of Example 2 and Comparative Example 2 was air-vulcanized at 180° C. for 4 minutes.

TABLE 1

| Components | Example 1 | Example 2 |
|---|---|---|
| EPT (ethylene-propylene terpolymer) (Sumitomo Chemical Co. Esprene 501A) | 30 | 30 |
| oil-extended SBR (Nippon Synthetic Rubber Co., JSR 1778N) | 100 | 100 |
| SRF carbon black | 20 | 20 |
| FEF carbon black | 10 | 10 |
| nephthene type process oil | 50 | 50 |
| clay | 80 | 80 |
| stearic acid | 1 | 1 |
| wax (Seiko Chemical Co., Santite E) | 1 | 1 |
| 2,5-di-tert.-butyl hydroquinone | 1 | 1 |
| zinc oxide No. 3 | 5 | 5 |
| sulfur | 1.5 | 1.5 |
| dipentamethylene thiuram hexasulfide | 1.5 | 0.5 |
| N-cyclohexyl-2-benzothiazysulphone amide | 1 | 1 |
| zinc dimethyl dithiocarbamate | 1.5 | 0.5 |
| organic amine (Yoshitome Seiyaku Co., Acting SL) | 1.5 | 0.5 |
| dinitrosopentamethylene tetramine | — | 3 |
| urea compound (Eiwa Kasei Co., Cellupaste K-5) | — | 2.5 |
| triethanol amine | 15 | 15 |

TABLE 1-continued

| Components | Example 1 | Example 2 |
|---|---|---|
| sodium benzoate (corrosion inhibitor) | 10 | 10 |
| acrylic acid-vinylalcohol copolymer (water-absorbable polymer) | 60 | 60 |

TABLE 2

| Components | Comparative Example 1 | Comparative Example 2 |
|---|---|---|
| EPT | 100 | 100 |
| clay | 150 | 50 |
| naphthene type process oil | 70 | 70 |
| zinc oxide No. 3 | 5 | 5 |
| stearic acid | 1 | 1 |
| sulfur | 2 | 2 |
| zinc dimethyl dithiocarbamate | 1 | 1 |
| dipentamethylene thiuram hexasulfide | 1 | 1 |
| 2-mercapto benzothiazole | 2 | 2 |
| N-cyclohexyl-2-benzothiazylsulphane amide | 1 | 1 |
| dinitrosopentamethylene tetramine | — | 3 |
| urea compound (Eiwa Chemical Co., Cellupaste K-5) | — | 2.5 |
| oxyethylene oxypropylene blockcopolymer (surfactant) | 20 | 20 |
| acrylic acid-vinyl alcohol copolymer (water-absorbable polymer) | 60 | 60 |

The results of the corrosion inhibition test and the expansion in water test are shown in Table 3.

TABLE 3

| | Corrosion rate | Corrosion inhibition rate | volume rate of expansion |
|---|---|---|---|
| Blank test | 34 (mdd) | — | — |
| Example 1 | 0.4 | Z = 98.8% | 376% |
| Example 2 | 2.5 | Z = 92.6% | 427% |
| Comparative Example 1 | 34 | Z = 0 | 274% |
| Comparative Example 2 | 35 | Z = −2.9% | 369% |

EXAMPLES 3 AND 4 AND COMPARATIVE EXAMPLES 3 AND 4:

The following samples were prepared from the compositions given in Table 4:

Non-crosslinking type, non-foaming type, corrosion resistant, water expandable sealant (Example 3), non-crosslinking type, foaming type, corrosion resistant, water expandable sealant (Example 4), non-crosslinking, non-foaming water expandable sealant without any corrosion inhibitor (Comparative Example 3) and non-crosslinking type, foaming type, water expandable sealant without any corrosion inhibitor (Comparative Example 4).

The components were blended in a supermixer, and a Banbury mixer and were then heated using a heat roll. Thereafter calendered sheets 2.5 mm thick were obtained using a calender roll.

Each of the sheets of Example 3 and Comparative Example 3 was compressed at 150° C. for 5 minutes by using a mold having a depth of 2 mm to vulcanize the resin. Each of the sheets of Example 4 and Comparative Example 4 was air-vulcanized at 210° C. for 90 seconds.

TABLE 4

| | Ex. 3 | Ex. 4 | Comp. Ex. 3 | Comp. Ex. 4 |
|---|---|---|---|---|
| polyvinyl chloride | 100 | 100 | 100 | 100 |
| DOP | 80 | 80 | 80 | 80 |
| Ba/Zn type stabilizer (Kyodo Yakuhin Co., KV 66A-5) | — | 2.5 | — | 2.5 |
| Ba/Zn type stabilizer (Adeka Argas Co., AC-182) | 2.5 | — | 2.5 | — |
| epoxide group-introduced bean oil (Adeka Argas Co., 0-130P) | 5 | 5 | 5 | 5 |
| ground calcium carbonate | 100 | 100 | 100 | 100 |
| azodicarboxylic amide | — | 2.5 | — | 2.5 |
| oxyethylene oxypropylene block copolymer | — | — | 20 | 20 |
| cyclohexyl amine (corrosion inhibitor) | 10 | 10 | — | — |
| benzoic acid (corrosion inhibitor) | 5 | 5 | — | — |
| sodium phosphate (corrosion inhibitor) | 5 | 5 | — | — |
| isobutylene-maleic anhydride copolymer | 60 | 60 | 60 | 60 |

The results of the corrosion inhibition test and expansion in water test are shown in Table 5.

TABLE 5

| | Corrosion rate | Corrosion inhibition rate | volume rate of expansion |
|---|---|---|---|
| Blank test | 34 (mdd) | — | — |
| Example 3 | 0.3 | Z = 99.1% | 206% |
| Example 4 | 0.6 | Z = 98.2% | 214% |
| Comparative Example 3 | 33 | Z = 2.9% | 171% |
| Comparative Example 4 | 35 | Z = −2.9% | 197% |

I is very clear from the above Examples and Comparative Examples that the present corrosion resistant, water expandable compositions are expanded in water without causing corrosion of the metallic material to form a good seal.

What is claimed is:

1. A corrosion resistant, water expandable composition comprising:
   (A) 100 parts by weight of at least one ethylene-propylene terpolymer;
   (B) 10-200 parts by weight of a water-absorbable material; and
   (C) 5-30 parts by weight of a corrosion inhibitor.
2. The composition of claim 1 wherein said water-absorbable material is starch-polyacrylic acid graft copolymer.
3. The composition of claim 1 wherein said water-absorbable material is carboxymethyl cellulose.
4. The composition of claim 1 wherein said water-absorbable material is an acrylic type polymer.
5. The composition of claim 1 wherein said water-absorbable material is isobutylene-maleic anhydride.
6. The composition of claim 1 wherein the water-solubility of the corrosion inhibitor is in the range of 0.05-50 g/l at 20° C.
7. The composition of claim 1 wherein the composition has a pH of 5-11.

* * * * *